United States Patent
Chan et al.

(10) Patent No.: US 11,746,968 B1
(45) Date of Patent: Sep. 5, 2023

(54) MINIATURE BACKLIGHT KIT

(71) Applicant: Primax Electronics Ltd., Taipei (TW)

(72) Inventors: Wei-Ping Chan, Taipei (TW); Ruey-Piin Wang, Taipei (TW); Chia-Ming Li, Taipei (TW); Yin-Liang Hu, Taipei (TW); Ming-Han Yu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/122,568

(22) Filed: Mar. 16, 2023

(30) Foreign Application Priority Data

Jan. 31, 2023 (TW) ................... 112103368

(51) Int. Cl.
*F21S 4/28* (2016.01)
*F21V 17/06* (2006.01)
*F21V 13/04* (2006.01)

(52) U.S. Cl.
CPC ............... *F21S 4/28* (2016.01); *F21V 13/04* (2013.01); *F21V 17/06* (2013.01); *F21V 2200/20* (2015.01)

(58) Field of Classification Search
CPC .. F21S 4/28; F21V 13/04; F21V 17/06; F21V 2200/20
See application file for complete search history.

(56) References Cited

U.S. PATENT DOCUMENTS 8,911,102 B2 * 12/2014 Holman ................. F21S 8/026
362/147

* cited by examiner

*Primary Examiner* — Jason M Han
(74) *Attorney, Agent, or Firm* — KIRTON McCONKIE; Evan R. Witt

(57) ABSTRACT

A miniature backlight kit includes a covering member, a light-shading element, a light guide element, a housing and a light-emitting unit. The light-emitting unit is disposed within a first concave structure of the light-shading element. The light-shading element is disposed within a second concave structure of the light guide element. The light guide element is covered by the lateral wall of the housing. The light-emitting unit emits a light beam. The light beam is reflected to the lateral wall of the housing by the light guide element. Consequently, a luminance gradient region is formed on the surface of the lateral wall of the housing.

10 Claims, 6 Drawing Sheets

MINIATURE BACKLIGHT KIT

FIELD OF THE INVENTION

The present invention relates to a light source structure, and more particularly to a backlight kit for an electronic device.

BACKGROUND OF THE INVENTION

As known, a light emitting diode (LED) has the characteristics of small size, low power consumption, long life and quick operation response. Consequently, LEDs have been widely applied to the backlight sources of sign lights, advertising lights, vehicle light sources, motorcycle light sources, outdoor/indoor lighting devices, monitors or computer peripherals.

In today's society, electronic devices have become daily necessities for life. Due to diverse types of electronic devices, the competitive pressure of similar categories of products is also increasing. In order to make the produced electronic devices more recognizable, LED light sources are usually installed in electronic devices. Due to the arrangement of the LED light source, the electronic device can produce a special luminous visual effect. The luminous visual effect can attract the consumers' attention. In addition, the installation of the LED light source increases the convenience of using the electronic device. Consequently, the electronic devices can gain the favor of consumers and enhance their buying willingness.

FIG. 1 is a schematic perspective view illustrating a portion of the structure of a conventional backlight kit. The conventional backlight kit 90 is designed according to a backlight technology. As shown in FIG. 1, the conventional backlight kit 90 comprises a housing 91, a light-guiding element 92 and a LED light source 93. The light-guiding element 92 comprises a first light-guiding part 921 and a second light-guiding part 922. The thickness of the light-guiding element 92 is gradually decreased from the first light-guiding part 921 to the second light-guiding part 922. The LED light source 93 is located under the first light-guiding part 921. After a light beam L emitted by the LED light source 93 is projected to the first light-guiding part 921, a luminance gradient region B' is formed on the surface of the light-guiding element 92 according to the thickness change of the light-guiding element 92. Consequently, the electronic device with the backlight kit 90 produces a luminance-gradient visual effect.

However, since the first light-guiding part 921 of the light-guiding element 92 is relatively thicker, this design is detrimental to the miniaturization of the overall volume of the electronic device. Consequently, the electronic device cannot meet the slimness requirements. Moreover, since the LED light source 93 is a point light source, the lighting point is very concentrated. When the LED light source 93 emits the light beam L toward the first light-guiding part 921, it is easy to form speckles in the luminance gradient region B'. Consequently, the overall luminance-gradient visual effect of the luminance gradient region B' is adversely affected.

In order to overcome the drawbacks of the conventional technologies, it is important to provide a miniature backlight kit. The overall volume of the electronic device with the miniature backlight kit is effectively reduced. In addition, the influence of the speckles from the LED light source on the luminance-gradient visual effect is reduced.

SUMMARY OF THE INVENTION

An object of the present invention provides a miniature backlight kit for an electronic device or a peripheral connection port of the electronic device. The miniature backlight kit can provide a function of producing a luminance-gradient visual effect.

In accordance with an aspect of the present invention, a miniature backlight kit is provided. The miniature backlight kit includes a covering member, a light-shading element, a light guide element, a housing and at least one light-emitting unit. The covering member includes a supporting structure. The light-shading element is installed on the supporting structure. The covering member includes a first surface and a second surface. The first surface and the second surface are opposed to each other. A first concave structure is formed in the second surface. The light guide element is installed on the supporting structure. The light guide element includes a third surface and a fourth surface. The third surface and the fourth surface are opposed to each other. A second concave structure is formed in the fourth surface. A convex structure is formed on the fourth surface. The second concave structure and the convex structure are located beside each other. The light-shading element is disposed within the second concave structure. The first surface of the light-shading element is covered by the light guide element. An open end of the first concave structure of the light-shading element faces the convex structure. A side of the convex structure away from the second concave structure has a light reflection slant. The housing is combined with the covering member. The housing includes a lateral wall. The third surface of the light guide element is covered by the lateral wall. The at least one light-emitting unit is disposed within the first concave structure of the light-shading element. The at least one light-emitting unit emits a light beam. A portion of the light beam projected upwardly is blocked by the light-shading element. The light beam is transmitted to the light reflection slant of the convex structure and reflected by the light reflection slant. Consequently, multi-angle beams are created from the light reflection slant and projected to the third surface of the light guide element. While the multi-angle beams are transmitted through the light guide element, a luminance of the multi-angle beams is gradually attenuated with an increasing transmission distance and a decreasing transmission medium. After the multi-angle beams are exited from the third surface of the light guide element, the multi-angle beams are transmitted to the lateral wall of the housing. Consequently, a luminance gradient region is formed on the surface of the lateral wall of the housing.

In an embodiment, the light-emitting unit is a top-view light-emitting unit.

In an embodiment, the light-emitting unit is a light emitting diode (LED) unit, an organic light emitting diode (OLED) unit, a quantum dots light emitting diode (QLED) unit or an electroluminescence (EL) unit.

In an embodiment, a white paint coating layer or a reflecting plate is formed on the light reflection slant.

In an embodiment, the covering member further includes a cover plate, and the supporting structure is externally protruded from a lateral side of the cover plate.

In an embodiment, the housing further includes a hollow part. The hollow part is enclosed and defined by the lateral wall. The cover plate is disposed within the hollow part.

In an embodiment, a stopping structure is formed on an inner surface of the lateral wall, and same sides of the light-shading element and the light guide element are contacted with the stopping structure.

In an embodiment, at least one bent rib is formed on the stopping structure, extended toward the hollow part, and fixed on a surface of the cover plate.

In an embodiment, plural light-guiding ribs are protruded downwardly from the convex structure of the light guide element, and the plural light-guiding ribs are supported on the supporting structure of the covering member. Moreover, plural light channels are formed between the convex structure of the light guide element and the supporting structure of the covering member.

In an embodiment, the light guide element is made of a light-guiding material containing a light diffusion material.

From the above descriptions, the present invention provides a miniature backlight kit with a slimness design. The miniature backlight kit can produce a luminance-gradient visual effect. Since the overall volume of the electronic device with the miniature backlight kit can be effectively reduced, and the electronic device can meet the slimness requirements. After the light beam emitted by the light-emitting unit is reflected by the light guide element, the light beam is transmitted to the light output surface. That is, the light beam is not directly projected to the light output surface. In addition, the problem of generating speckles on the luminance gradient region will be effectively solved.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
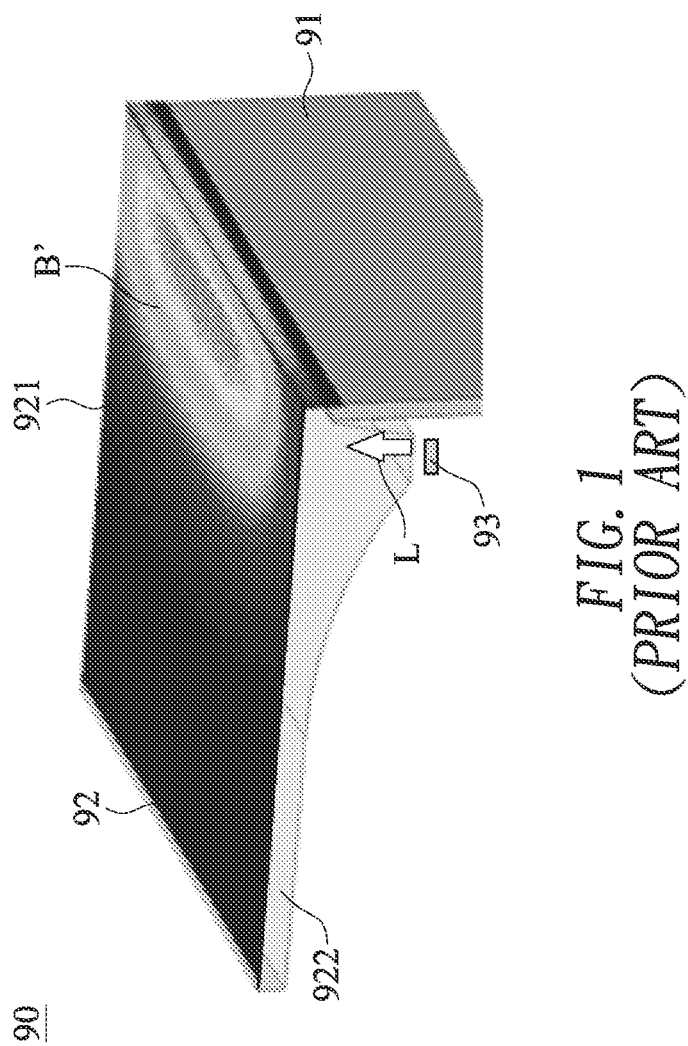
FIG. 1 is a schematic perspective view illustrating a portion of the structure of a conventional backlight kit.
Figure 2:
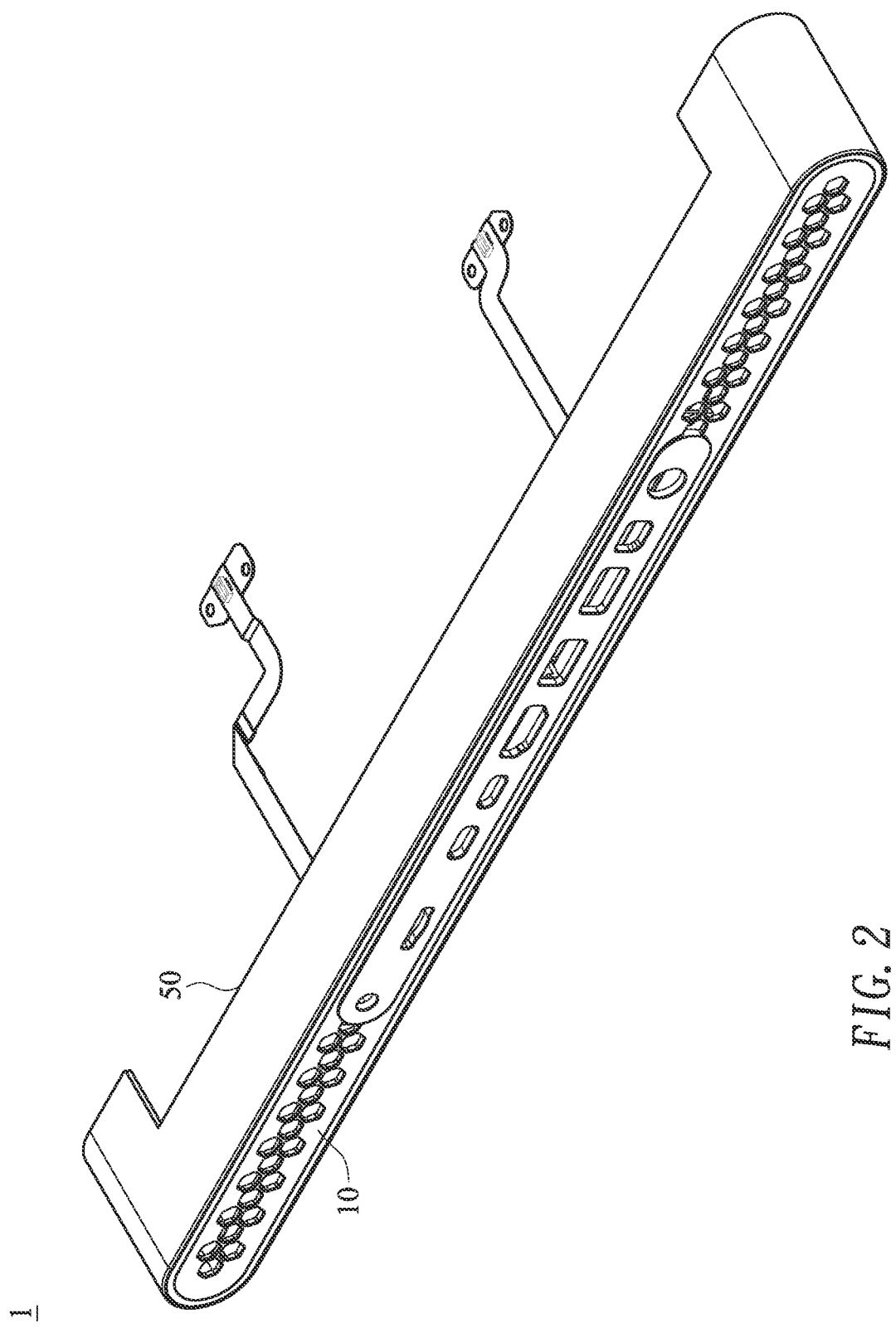
FIG. 2 is a schematic perspective view illustrating a miniature backlight kit according to an embodiment of the present invention.
Figure 3A:
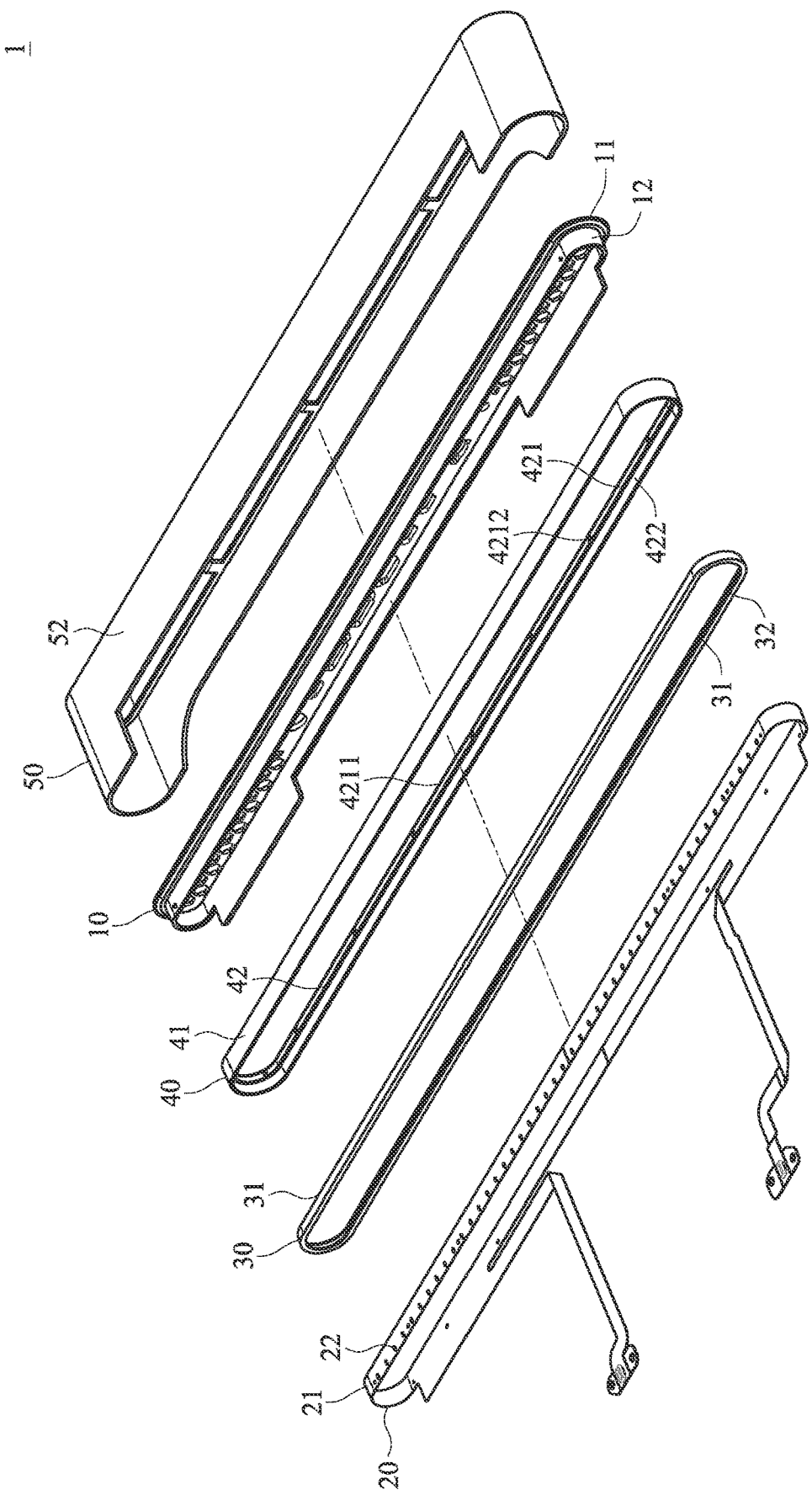
FIG. 3A is a schematic exploded view illustrating the miniature backlight kit according to the embodiment of the present invention and taken along a viewpoint.
Figure 3B:
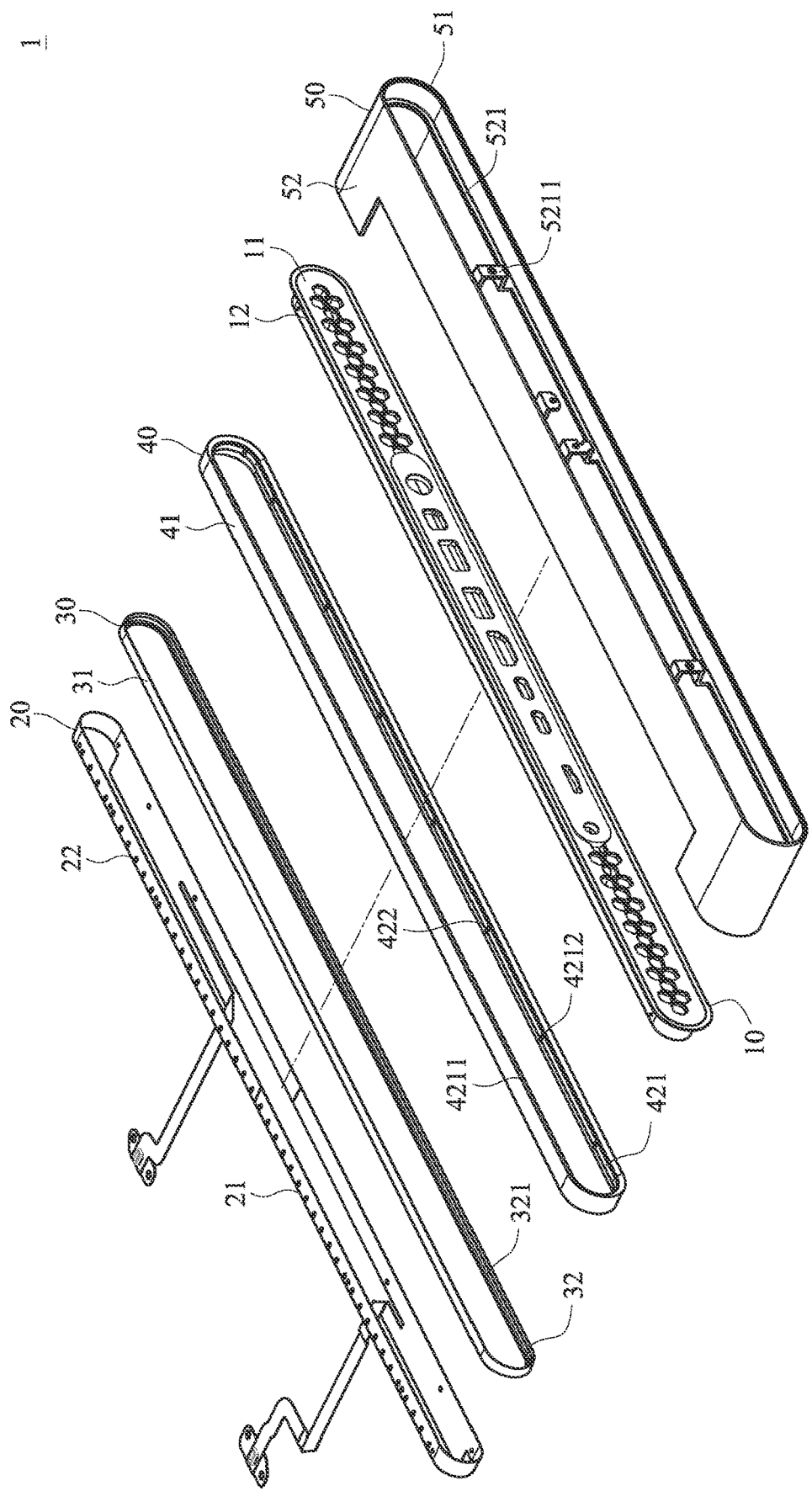
FIG. 3B is a schematic exploded view illustrating the miniature backlight kit according to the embodiment of the present invention and taken along another viewpoint.

Please refer to FIG. 2, FIG. 3A and FIG. 3B. FIG. 2 is a schematic perspective view illustrating a miniature backlight kit according to an embodiment of the present invention. FIG. 3A is a schematic exploded view illustrating the miniature backlight kit according to the embodiment of the present invention and taken along a viewpoint. FIG. 3B is a schematic exploded view illustrating the miniature backlight kit according to the embodiment of the present invention and taken along another viewpoint.

The miniature backlight kit 1 of the present invention can be installed on a housing of an electronic device (e.g., a desktop computer or a notebook computer) or a housing of a peripheral connection port of the electronic device. Furthermore, the miniature backlight kit 1 can produce a luminous visual effect to prompt the user to know the position of the peripheral connection port or the usage status of the peripheral connection port. In this embodiment, the miniature backlight kit 1 comprises a covering member 10, an illumination module 20, a light-shading element 30, a light guide element 40 and a housing 50.

The covering member 10 comprises a cover plate 11 and a supporting structure 12. The supporting structure 12 is externally protruded from a lateral side of the cover plate 11. In an embodiment, the supporting structure 12 is circumstantially formed on the lateral side of the cover plate 11. The cover plate 11 comprises plural openings for installing peripheral connection ports therein.

The illumination module 20 comprises a flexible circuit board 21 and plural light-emitting units 22. The plural light-emitting units 22 are installed on an installation surface of the flexible circuit board 21. In this embodiment, the light-emitting units 22 are top-view light-emitting units. For example, the light-emitting units 22 are light emitting diode (LED) units, organic light emitting diode (OLED) units, quantum dots light emitting diode (QLED) units or electroluminescence (EL) units.

The light-shading element 30 has a first surface 31 and a second surface 32, which are opposed to each other. A first concave structure 321 is formed in the second surface of the light-shading element 30. In order to match the shape of the supporting structure 12 and achieve the surrounding luminous visual effect of the miniature backlight kit 1, the light-shading element 30 has a ring-shaped profile.

The light guide element 40 is made of a light-guiding material containing a light diffusion material. In addition, the light guide element 40 has a third surface 41 and a fourth surface 42, which are opposed to each other. The fourth surface 42 of the light guide element 40 is provided with a convex structure 421 and a second concave structure 422, which are arranged beside each other. A first side of the convex structure 421 is located beside the second concave structure 422. A second side of the convex structure 421 is away from the second concave structure 422. In addition, the second side of the convex structure 421 has a light reflection slant 4211. In addition, plural light-guiding ribs 4212 are discretely arranged on the surface of the convex structure 421. In order to match the shape of the supporting structure 12 and achieve the surrounding luminous visual effect of the miniature backlight kit 1, the light guide element 40 has a ring-shaped profile.

The housing 50 comprises a lateral wall 52 and a hollow part 51. The hollow part 51 is enclosed and defined by the lateral wall 52. A stopping structure 521 is formed on an inner surface of the lateral wall 52. In addition, at least one bent rib 5211 is formed on the stopping structure 521 and extended toward the hollow part 51.

Figure 4:
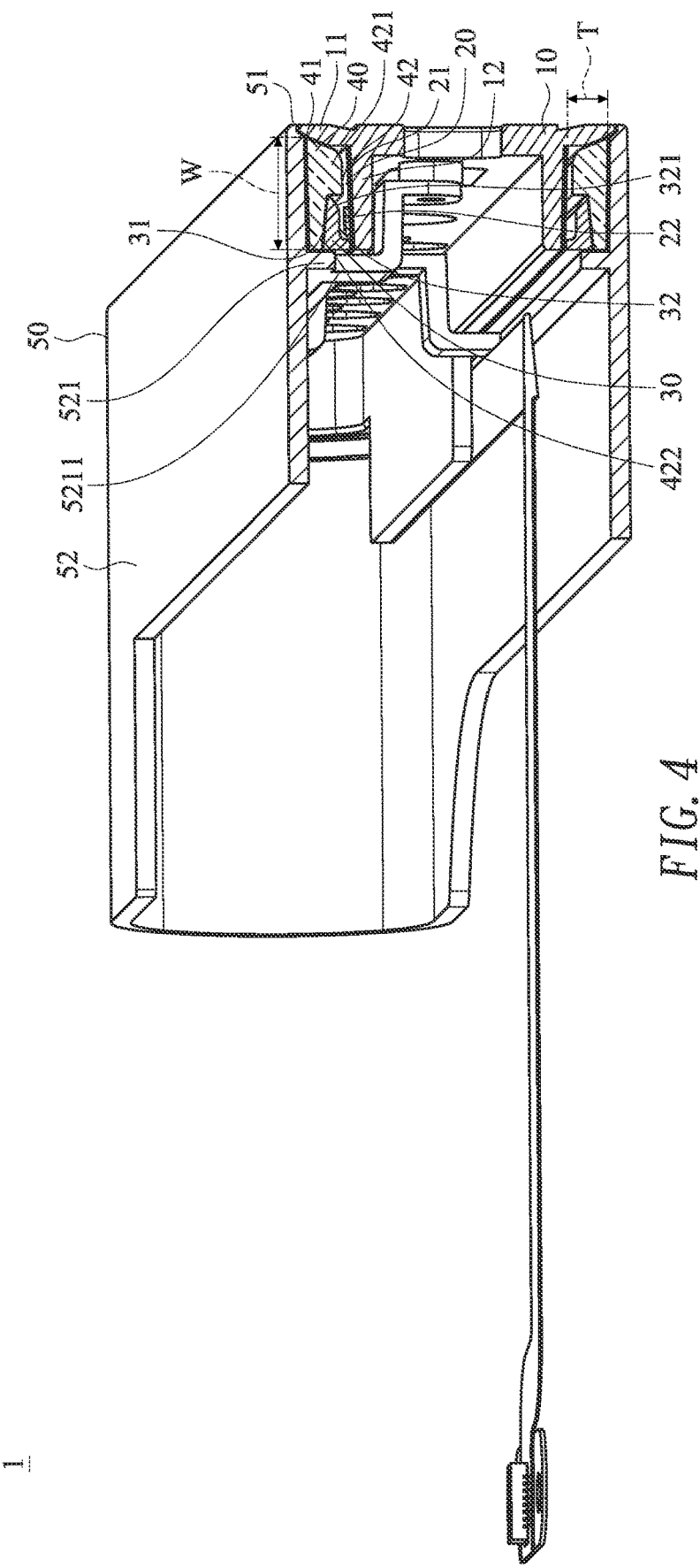
FIG. 4 is a schematic cutaway view illustrating the miniature backlight kit according to the embodiment of the present invention.

Please refer to FIG. 4. FIG. 4 is a schematic cutaway view illustrating the miniature backlight kit according to the embodiment of the present invention. A process of assembling the miniature backlight kit 1 will be described as follows.

Firstly, an adhesive or a double-sided tape is formed on another surface of the flexible circuit board 21 where the light-emitting units 22 are not installed. Then, the illumination module 20 is adhered on the surface of the supporting structure 12 of the covering member 10. Then, the light guide element 40 is sheathed around the supporting structure 12 of the covering member 10. In addition, the side of the light guide element 40 with the convex structure 421 is contacted with the cover plate 11 of the covering member 10. In an embodiment, the light guide element 40 has a largest thickness T and a largest width W. The largest thickness T is equal to or larger than 3.5 mm, and the largest width W is equal to or larger than 8 mm.

Then, the light-shading element 30 is sheathed around the supporting structure 12 of the covering member 10. In addition, the light-shading element 30 is embedded within the second concave structure 422 of the light guide element 40. Meanwhile, the light-emitting units 22 are disposed within the first concave structure 321 of the light-shading element 30. In addition, the open end of the first concave structure 321 of the light-shading element 30 faces the convex structure 421 of the light guide element 40.

Afterwards, the cover plate 11 of the covering member 10 is installed within the hollow part 51 of the housing 50. In addition, the same sides of the light-shading element 30 and the light guide element 40 are contacted with the stopping structure 521 on the inner surface of the lateral wall 52 of the housing 50, and the third surface 41 of the light guide element 40 is covered by the lateral wall 52 of the housing 50. The at least one bent rib 5211 extended toward the hollow part 51 is fixed on the surface of the cover plate 11 of the covering member 10 in a screwing, gluing, an engaging means or any other appropriate coupling means. Consequently, the covering member 10 and the housing 50 are combined together.

Figure 5:
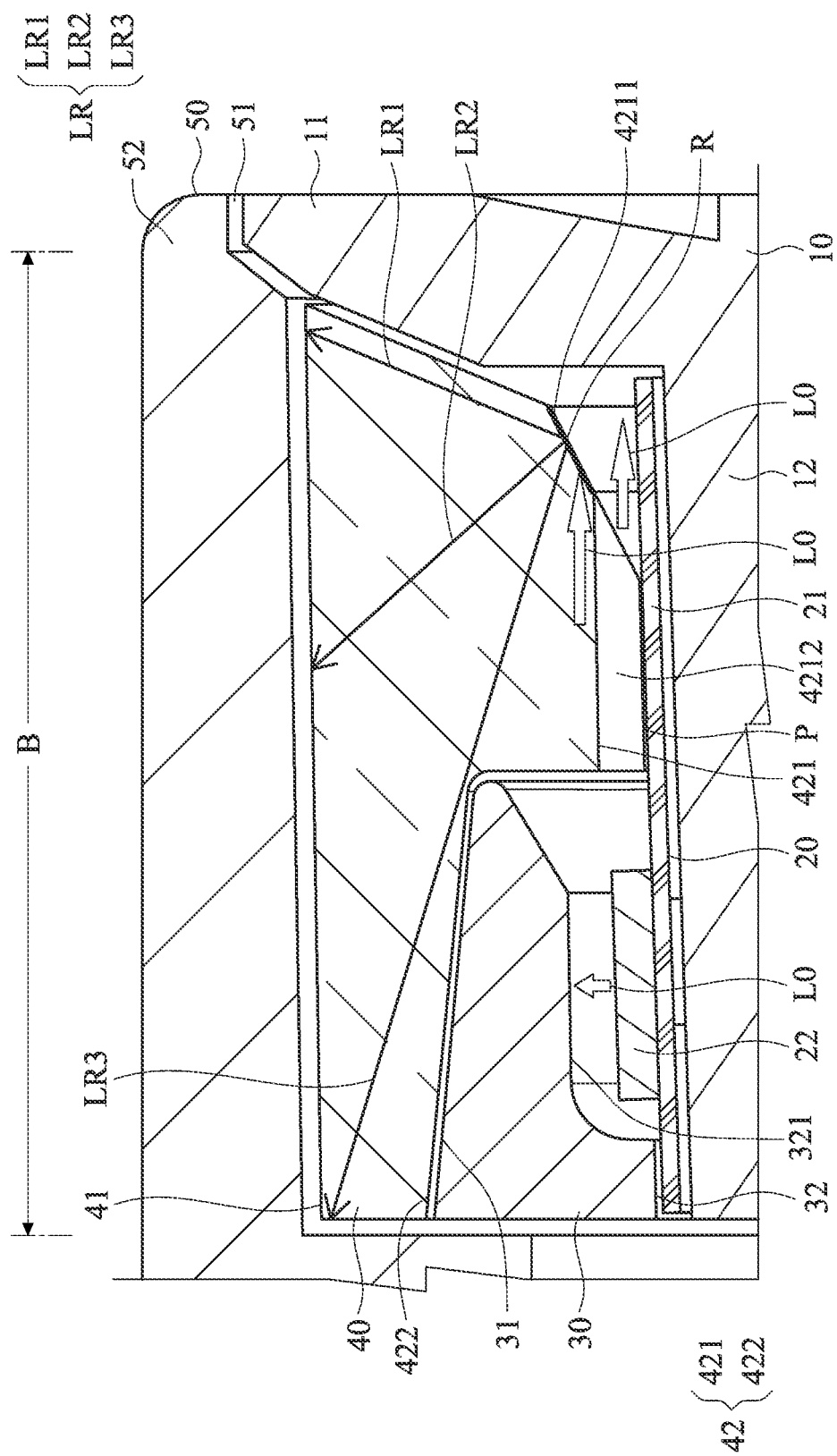
FIG. 5 is a schematic cross-sectional view illustrating an enlarged portion of the miniature backlight kit according to the embodiment of the present invention.

Please refer to FIG. 5. FIG. 5 is a schematic cross-sectional view illustrating an enlarged portion of the miniature backlight kit according to the embodiment of the present invention. As shown in FIG. 5, the plural light-guiding ribs 4212 on the convex structure 421 are supported on the supporting structure 12. In this embodiment, the plural light-guiding ribs 4212 are contacted with the flexible circuit board 21, which is attached on the surface of the supporting structure 12. In addition, plural light channels P are formed between the convex structure 421 of the light guide element 40 and the supporting structure 12 of the covering member 10. Furthermore, a white paint coating layer R is formed on the light reflection slant 4211 of the convex structure 421. The white paint coating layer R can reflect the light beam. It is noted that numerous modifications and alterations may be made while retaining the teachings of the invention. For example, in another embodiment, the white paint coating layer R is replaced by a reflecting plate.

Please refer to FIG. 5 again. After the light-emitting unit 22 in the first concave structure 321 of the light-shading element 30 emits a light beam L0, a portion of the light beam L0 is projected upwardly to the light-shading element 30 and blocked by the light-shading element 30. In other words, the upwards-projected portion of the light beam L0 cannot be transmitted to the third surface 41 of the light guide element 40 directly. In addition, another portion of the light beam L0 emitted by the light-emitting unit 22 is directly projected to the convex structure 421 of the light guide element 40 through the open end of the first concave structure 321. Alternatively, another portion of the light beam L0 emitted by the light-emitting unit 22 is reflected by the inner surface of the first concave structure 321 and projected to the convex structure 421 of the light guide element 40 through the open end of the first concave structure 321. In addition, a portion of the light beam L0 is transmitted to the edge region of the cover plate 11 of the covering member 10 through the light channel P. Consequently, the edge region of the cover plate 11 produces a luminous visual effect.

Moreover, another portion of the light beam L0 is transmitted to the light reflection slant 4211 of the convex structure 421 through the convex structure 421 of the light guide element 40, and reflected by the white paint coating layer R on the light reflection slant 4211. Consequently, multi-angle beams LR are created from the light reflection slant 4211 and projected to the third surface 41 of the light guide element 40. While the multi-angle beams LR are transmitted through the light guide element 40, the luminance of the multi-angle beams LR is gradually attenuated with the increasing transmission distance and the decreasing transmission medium.

For example, the multi-angle beams LR comprises the multi-angle beams LR1, LR2 and LR3. The projection angles of the multi-angle beams LR1, LR2 and LR3 are different. Among these multi-angle beams LR1, LR2 and LR3, a first transmission distance of the multi-angle beam LR1 between the light reflection slant 4211 of the convex structure 421 to the third surface 41 of the light guide element 40 (e.g., the region of the third surface 41 over the light reflection slant 4211) is the shortest. Consequently, the luminance of the multi-angle beam LR1 is the highest. Moreover, a second transmission distance of the multi-angle beam LR2 between the light reflection slant 4211 of the convex structure 421 to the third surface 41 of the light guide element 40 (e.g., a middle region of the third surface 41) is longer than the first transmission distance. Consequently, the luminance of the multi-angle beam LR2 is lower than the luminance of the multi-angle beam LR1. Moreover, a third transmission distance of the multi-angle beam LR3 between the light reflection slant 4211 of the convex structure 421 to the third surface 41 of the light guide element 40 (e.g., the farthest region of the third surface 41 away from the light reflection slant 4211 of the convex structure 421) is the longest. Consequently, the luminance of the multi-angle beam LR3 is lower than the luminance of the multi-angle beam LR2.

In this embodiment, the thickness of the light guide element 40 is gradually decreased from the convex structure 421 to the second concave structure 422. When the multi-angle beam LR3 is transmitted to the region of the light guide element 40 corresponding to the concave structure 422, the thickness of the light transmission medium (i.e., the thickness of the light guide element 40) is gradually decreased. Consequently, the luminance of the multi-angle beam LR3 is lowered.

In this embodiment, only three multi-angle beams LR1, LR2 and LR3 projected in three directions are shown. In practice, the light beams reflected by the white paint coating layer R and covered in the range between the multi-angle beam LR1 and the multi-angle beam LR3 may be regarded as the multi-angle beams LR.

After the multi-angle beams LR are exited from the light output surface (i.e., the third surface 41 of the light guide element 40), the multi-angle beams LR are transmitted to the lateral wall 52 of the housing 50. Consequently, a luminance gradient region B is formed on the surface of the lateral wall 52 of the housing 50. Under this circumstance, the lateral wall 52 of the housing 50 produces a luminance-gradient visual effect.

From the above descriptions, the present invention provides a miniature backlight kit with a slimness design. The miniature backlight kit can produce a luminance-gradient visual effect. Since the overall volume of the electronic device with the miniature backlight kit can be effectively reduced, and the electronic device can meet the slimness requirements. After the light beam emitted by the light-emitting unit is reflected by the light guide element, the light beam is transmitted to the light output surface. That is, the light beam is not directly projected to the light output surface. In addition, the problem of generating speckles on the luminance gradient region will be effectively solved. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A miniature backlight kit, comprising:
    a covering member comprising a supporting structure;
    a light-shading element installed on the supporting structure, and comprising a first surface and a second surface, wherein the first surface and the second surface are opposed to each other, and a first concave structure is formed in the second surface;
    a light guide element installed on the supporting structure, and comprising a third surface and a fourth surface, wherein the third surface and the fourth surface are opposed to each other, a second concave structure is formed in the fourth surface, a convex structure is formed on the fourth surface, and the second concave structure and the convex structure are located beside each other, wherein the light-shading element is disposed within the second concave structure, the first surface of the light-shading element is covered by the light guide element, an open end of the first concave structure of the light-shading element faces the convex structure, and a side of the convex structure away from the second concave structure has a light reflection slant;
    a housing combined with the covering member, and comprising a lateral wall, wherein the third surface of the light guide element is covered by the lateral wall; and
    at least one light-emitting unit disposed within the first concave structure of the light-shading element, and emitting a light beam, wherein a portion of the light beam projected upwardly is blocked by the light-shading element, and the light beam is transmitted to the light reflection slant of the convex structure and reflected by the light reflection slant, so that multi-angle beams are created from the light reflection slant and projected to the third surface of the light guide element,
    wherein while the multi-angle beams are transmitted through the light guide element, a luminance of the multi-angle beams is gradually attenuated with an increasing transmission distance and a decreasing transmission medium, wherein after the multi-angle beams are exited from the third surface of the light guide element, the multi-angle beams are transmitted to the lateral wall of the housing, so that a luminance gradient region is formed on the surface of the lateral wall of the housing.

2. The miniature backlight kit according to claim 1, wherein the light-emitting unit is a top-view light-emitting unit.

3. The miniature backlight kit according to claim 1, wherein the light-emitting unit is a light emitting diode (LED) unit, an organic light emitting diode (OLED) unit, a quantum dots light emitting diode (QLED) unit or an electroluminescence (EL) unit.

4. The miniature backlight kit according to claim 1, wherein a white paint coating layer or a reflecting plate is formed on the light reflection slant.

5. The miniature backlight kit according to claim 1, wherein the covering member further comprises a cover plate, and the supporting structure is externally protruded from a lateral side of the cover plate.

6. The miniature backlight kit according to claim 5, wherein the housing further comprises a hollow part, wherein the hollow part is enclosed and defined by the lateral wall, and the cover plate is disposed within the hollow part.

7. The miniature backlight kit according to claim 6, wherein a stopping structure is formed on an inner surface of the lateral wall, and same sides of the light-shading element and the light guide element are contacted with the stopping structure.

8. The miniature backlight kit according to claim 7, wherein at least one bent rib is formed on the stopping structure, extended toward the hollow part, and fixed on a surface of the cover plate.

9. The miniature backlight kit according to claim 1, wherein plural light-guiding ribs are protruded downwardly from the convex structure of the light guide element, and the plural light-guiding ribs are supported on the supporting structure of the covering member, wherein plural light channels are formed between the convex structure of the light guide element and the supporting structure of the covering member.

10. The miniature backlight kit according to claim 1, wherein the light guide element is made of a light-guiding material containing a light diffusion material.

* * * * *